United States Patent
Davies

(10) Patent No.: US 6,762,603 B2
(45) Date of Patent: Jul. 13, 2004

(54) DUAL MODE COATING THICKNESS MEASURING INSTRUMENT

(76) Inventor: Colin Davies, 39 Shaw Hall Bank Road, Greenfield, Oldham, Lancashire (GB), O13 7LD (*) Notice: Subject to any disclaimer, the term of this patent is extended or adjusted under 35 U.S.C. 154(b) by 0 days.

(21) Appl. No.: 09/900,750

(22) Filed: Jul. 6, 2001

(65) Prior Publication Data

US 2002/0008511 A1 Jan. 24, 2002

(30) Foreign Application Priority Data

Jul. 6, 2000 (GB) .............................................. 0016591

(51) Int. Cl.[7] .............................. G01B 7/16; G01R 33/12
(52) U.S. Cl. ........................ 324/230; 324/225; 324/240
(58) Field of Search ................................ 324/229, 230, 324/231, 225, 207.16, 207.12, 239, 240

(56) References Cited

U.S. PATENT DOCUMENTS

| 4,005,359 A | * | 1/1977 | Smoot ......................... 324/230 |
| 4,088,952 A | * | 5/1978 | Sikora ......................... 324/239 |
| 4,567,435 A | * | 1/1986 | Yamada et al. ........ 324/207.12 |
| 5,889,401 A | * | 3/1999 | Jourdain et al. ............. 324/230 |

* cited by examiner

*Primary Examiner*—Jay Patidar
(74) *Attorney, Agent, or Firm*—Salter & Michaelson

(57) ABSTRACT

A coating thickness measuring instrument is provided. The coating thickness measuring instrument has a first mode of operation in which it is operative to make measurements with a first resolution and a second mode of operation in which it is operative to make measurements with a second resolution, the first resolution being greater than the second. The instrument may provide a first short range high resolution mode and a second long range low resolution mode. The first range may be contained in or overlap the second range.

19 Claims, 2 Drawing Sheets

DUAL MODE COATING THICKNESS MEASURING INSTRUMENT

BACKGROUND

1. Technical Field

The present disclosure relates to a coating thickness measuring instrument and, in particular, to a coating thickness measuring instrument employing an inductive probe.

2. Related Art

Conventional coating thickness measuring instruments having an inductive probe only allow thickness measurements to be made in a single limited range. A user therefore needs to select an instrument having a suitable measurement capability for his needs. If the user wishes to make measurements over a greater range than can be accommodated by a single instrument he must buy one or more additional instruments with different ranges, or at least one or more probes for a single instrument.

Having to use more than one instrument or probe is expensive and inconvenient. The additional cost is particularly difficult to justify where a user only occasionally wishes to make measurements outside a range catered for by a single instrument or probe.

It is an object of the present disclosure to address this problem.

SUMMARY

According to a first aspect of the present disclosure there is provided a coating thickness measuring instrument having a first mode of operation in which it is operative to make measurements with a first resolution and a second mode of operation in which it is operative to make measurements with a second resolution, the first resolution being greater than the second.

Provision of two such modes of operation enables the range of measurement of a given probe or instrument to be extended whilst maximizing the available resolution of measurement. This will become more apparent from the following description.

When in the first mode the instrument is preferably operative to make measurements in a first range and when in the second mode, in a second range.

The second range is preferably wider than the first in which case the instrument provides a first, short range high resolution mode, and a second long range low resolution mode. The first and second ranges may be contiguous, overlap, or the first range may be contained within the second range. It will be appreciated that where the two ranges overlap or where one contains the other measurements may be taken in the common portion of the ranges in either mode of operation, to obtain measurements of different resolution.

The instrument preferably comprises an inductive probe comprising a drive coil and a pickup coil, more preferably two pickup coils. The probe is preferably detachable to allow other probes to be used with the instrument. The instrument can preferably operate in either the short or long range mode with a single probe.

The instrument preferably comprises a means to drive an alternating current of substantially constant amplitude in the drive coil. This may comprise an oscillator and associated control loop circuit arranged to control the oscillator in dependence upon the current flowing in the drive coil.

Further, there is preferably provided a means for varying the amplitude of the alternating current in the drive coil. This may comprise a digitally controlled potentiometer. This allows a desired amplitude to be set, then maintained by the control loop.

There is also preferably provided means for sensing the variation in coupling between the drive and pickup coils and converting this to a thickness value. This may comprise a differential amplifier, means for rectifying the output of the pickup coils and an analog to digital converter. The means for rectifying may comprise a synchronous detector and may also comprise a low pass filter. The synchronous detector may be controlled by a synchronizing signal derived from the means to drive an alternating current in the drive coil. The synchronizing signal may be phase shifted relative to the alternating current in the drive coil.

In order to provide for the second range mode a means is preferably provided to modify the amplitude of the current flowing in the drive coil in dependence upon the output from the pickup coils. This means may comprise a control loop which is preferably arranged to reduce the amplitude of the current supplied to the drive coil as the differential output of the pickup coils increases. A switch is preferably provided to enable the control loop to be switched in and out of operation, in order to switch the instrument between the first and second modes. This has the effect of flattening the response of the instrument as the probe approaches a suitable substrate, extending the range of the instrument, but reducing its resolution. Thus, the resolution of the instrument is lower in the second than first range mode, at least for measurements of a similar magnitude.

The instrument preferably includes a microprocessor. The microprocessor is preferably operative to control the amplitude of the current in the drive coil, the phase difference between the current in the drive coil and the synchronizing signal and the switch for switching in the control loop arranged to modify the amplitude of the current flowing in the drive coil.

The microprocessor is preferably also operative to generate a coating thickness value from the output of the analog to digital converter using a look-up table. The instrument preferably also includes a memory, which may be comprised in the microprocessor, for storing look-up tables for both long and short range mode operation. The memory may also store look-up tables for other probes. Each look-up table is preferably associated with a particular probe and mode of operation.

The microprocessor may switch in the second control loop in or out of operation at the selection of the user, or automatically upon independence of a thickness value detected. The instrument may include a user operable control, and a means for outputting information to a user, for example a display.

According to a second aspect of the present disclosure there is provided a coating thickness measuring instrument comprising an inductive probe having a drive coil and a pickup coil, a means for driving an alternating current in the drive coil, a means for detecting the output of the pickup coil and a means for modifying the current in the drive coil in dependence upon the output of the pickup coil.

Provision of a means for modifying the current in the drive coil extends the range of the instrument by allowing the gain of the instrument to be increased but preventing saturation when higher pickup coil outputs are experienced.

The means for modifying the current in the drive coil preferably comprises a control loop and is preferably switchable in and out of operation to provide two modes of operation for the instrument. The means for driving a current in the drive coil preferably also comprises a control loop, arranged to maintain the amplitude of the current in the drive coil at a substantially constant level. Means may be provided for setting and varying this constant level.

The means for driving may comprise an amplitude controlled oscillator with the control loop being implemented by a current to voltage rectifier, a low pass filter and an error amplifier. The means for modifying is preferably arranged to modify the input to the error amplifier and hence the amplitude of the current in the drive coil.

The means for detecting the output of the pickup coil may comprise a synchronous detector.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

Figure 1:
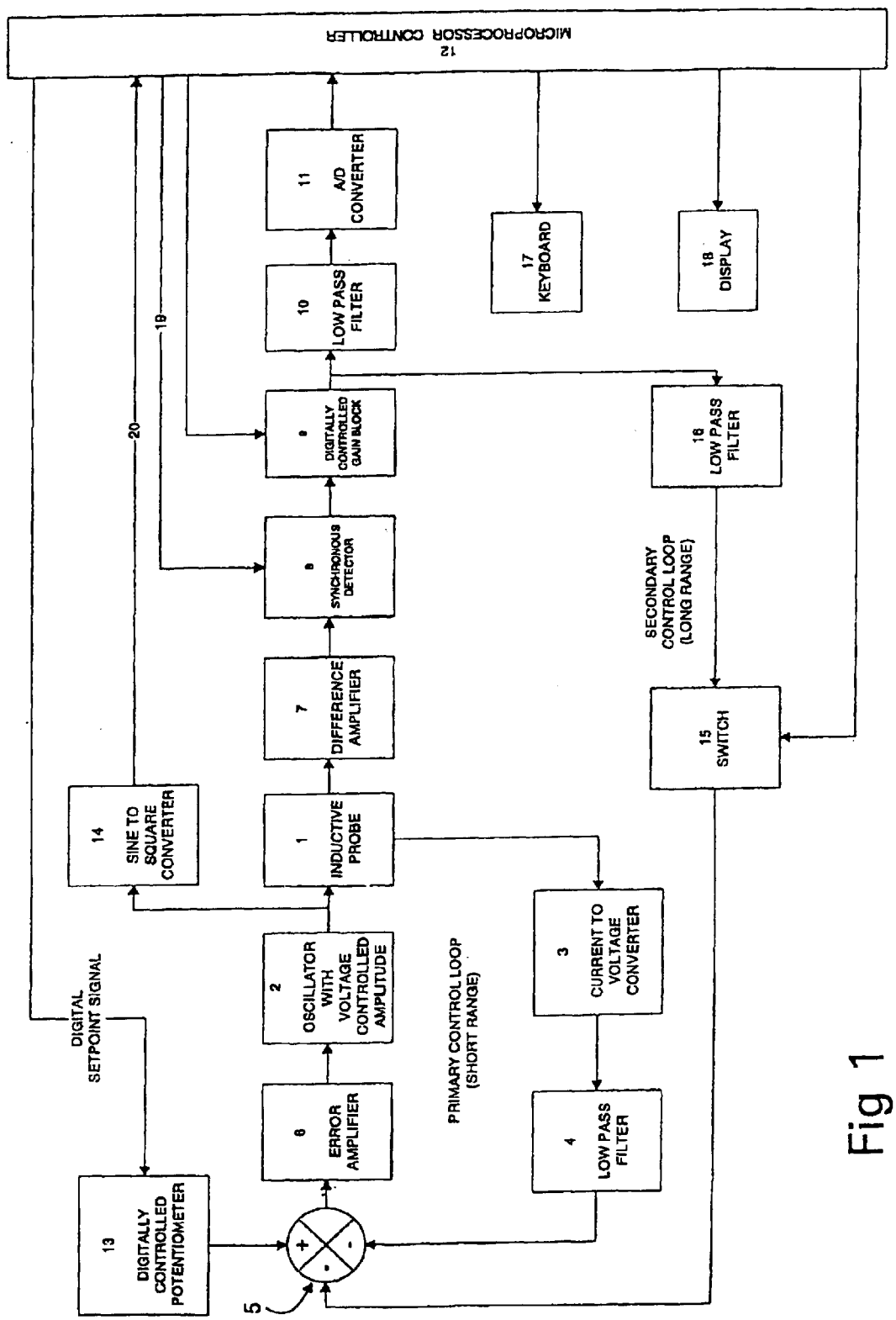
FIG. 1 is a schematic block circuit diagram of a coating thickness measuring instrument according to the present disclosure.
Figure 2:
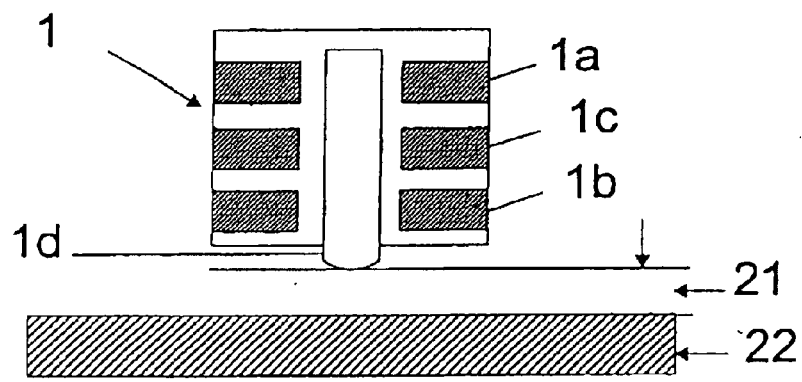
FIG. 2 shows a schematic cross-sectional view of the probe of FIG. 1 shown spaced above a substrate.

Referring to the drawings the instrument comprises a detachable inductive probe 1 of known type, incorporating two pickup coils 1a, 1b coaxially disposed at opposite sides respectively of a drive coil 1c. The probe 1 is detachable to enable different probes to be used with the instrument, for different applications. The probe also incorporates a tip 1d which includes a pin which extends through the three coils 1a, 1b and 1c.

An amplitude controlled oscillator 2 is provided to drive a sinusoidally alternating current in the drive coil 1c of the probe 1. The amplitude controlled oscillator 2 forms part of a first control loop for controlling the current in the drive coil 1c of the inductive probe 1. The control loop also includes a current to voltage rectifier 3 connected to the drive coil of the inductive probe and in turn to a current to voltage rectifier 3, low pass filter 4, summing junction 5 and error amplifier 6 which is connected to the voltage control amplifier 2. The control loop is arranged to maintain the amplitude of the current in the drive coil 1c of the inductive probe 1 at a substantially constant value, i.e. to stabilise the amplitude of the drive current. This constant value may be increased or decreased by modifying the voltage supplied to the error amplifier 6 by adding or subtracting a voltage at the summing junction 5, thereby to set the amplitude of the drive current at a desired level.

The two pickup coils of the inductive probe 1 are connected to respective inputs of a difference amplifier 7 (implemented by a low noise instrumentation amplifier) the output of which is fed, in series, through a synchronous detector 8, digitally controlled gain block 9, low pass filter 10 and analog to digital converter 11 to a microprocessor 12.

The microprocessor 12 controls operation of the instrument and is also connected to a digitally controlled potentiometer 13 which applies a voltage to the summing junction 5. The microprocessor 12 can thus control the amplitude of the alternating current in the drive coil 1c of the inductive probe 1. The microprocessor 12 is also connected to a sine to square converter 14 from which it may receive a signal. The sine to square converter 14 is also connected to the drive coil 1c of the inductive probe 1. The microprocessor 12 is also connected to a switch 15 under control of the microprocessor 12 and operative to bring into operation a second control loop by connecting the output of the digitally controlled gain block 9 to the voltage summing junction 5 via a low pass filter 16. In an alternative embodiment an instrument comprises an analog control loop and a comparator based switch. The microprocessor 12 is also connected to a user operable control 17, for example a keyboard, and to display 18.

The instrument is for measuring coating thickness, particularly, but not exclusively, coating thickness on ferrous substrates.

To do so the instrument relies on the principle that when an alternating current flows in the drive coil 1c of the inductive probe 1 the differential output of the two pickup coils 1a, 1b depends upon the proximity of the probe 1 to ferromagnetic material. The instrument has two modes of operation: short range in which relatively high resolution thickness measurements may be taken over a limited range and long range in which thickness measurements may be made over a greater range but with a lower resolution. The mode in which the instrument is operating is controlled by the microprocessor 12, either at the selection of a user, or automatically.

When operating in short range mode the microprocessor 12 adjusts the digitally controlled potentiometer 13, to cause an appropriate amplitude of current to flow in the drive coil 1c of the inductive probe 1, and opens switch 15. The instrument then operates as follows. The differential output of the two pickup coils 1a, 1b of the inductive probe 1 is output from the difference amplifier 7 and fed to the synchronous detector 8. The synchronous detector 8 alternately multiplies the output from the difference amplifier 7 by positive and negative values in a manner synchronized with the output to convert the output from an a.c. signal to a full wave rectified d.c. signal. The low pass filter 10 time averages this rectified signal and removes any non synchronous signals and provides a smooth d.c. signal to the A/D converter 11.

A phase adjusted synchronization signal 19 for controlling the synchronous detector 8 is provided by the microprocessor 12. This signal 19 is derived from the driving current of the drive coil of the inductive probe 1 by the sine to square converter 14 which supplies a square wave signal 20 to the microprocessor 12. The square wave signal 20 is synchronized with the current flowing in the probe drive coil 1c. This signal is phase shifted by the microprocessor 12 to produce the phase adjusted signal 19. The phase shift accommodates for phase difference between the signal driving the drive coil 1c and that detected by the pickup coils 1a, 1b of the inductive probe 1. The phase difference for a given probe can for practical purposes be assumed to be constant. The instrument includes provision for storing a suitable phase shift value for a given probe and may store values associated with each of a number of probes which may be fitted to the instrument.

The d.c. output of the synchronous detector 8 is then amplified as appropriate by the digitally controlled gain block 9, under the control of the microprocessor 12, before being filtered by the low pass filter 10 and conversion to a digital value by the analog to digital converter 11.

The effect of the synchronous detector 8 and low pass filter 10 is to select the signal of interest from the difference amplifier 7.

The resultant digital value is input to the microprocessor 12 which converts it into a thickness value using a look-up table stored by the instrument. The thickness value is then displayed on the display 18. The instrument can store a number of different look-up tables for use with each of a number of different probes.

In short range mode the output of the difference amplifier 7 and hence the digital value supplied to the microprocessor 12 by the analog to digital converter 11 varies very non-linearly with respect to the distance of the probe 1 from a ferromagnetic material. The relationship between the two is typically generally exponential, with the output falling as the probe 1 is moved away from a ferromagnetic material into 'free air.' This allows for high measuring resolution (typically 0.1 $\mu$m), when the probe 1 is close to a substrate, but much lower resolution (typically 75 $\mu$m) towards the probe's maximum usable range (typically 3 mm). Thus, the range over which high resolution measurements can be made is limited.

When operating in long range mode the microprocessor 12 adjusts the digital controlled potentiometer 13 to increase the amplitude of the current supplies to the drive coil of the inductive probe 1, closes switch 15 and selects an appropriate phase shift (for the synchronous detector drive signal) and look-up table for the probe being used. Different look-up tables are required for the same probe when used in short or long range modes.

The increased amplitude of current supplied to the drive coil 1c of the inductive probe 1 effectively increases the gain and hence range of the instrument. Closing switch 14 brings into operation the second control loop to control the amplitude of the current supplied to the drive coil 1c of the inductive probe 1.

Increasing the gain of the instrument alone would normally result in the output of low pass filter 10 saturating as the probe 1 approaches a substrate, limiting the measured range. Introducing the second control loop counters the occurrence of saturating the output of low pass filter 10. The second control loop acts to feed a d.c. signal proportional to the probe output to the summing junction 5 where it is subtracted from the input to the error amplifier 6. Thus, the gain of the instrument is effectively reduced as the inductive probe 1 approaches a substrate, resulting in the output of low pass filter 10, and hence the analog to digital converter 11, varying more linearly with distance of the inductive probe 1 from a ferromagnetic material, than when in short range mode.

The result is an increase in the overall usable range of the instrument at the expense of resolution at short distance. As a result, the typical resolution will be about 2 $\mu$m when the probe is close to a substrate and about 20 $\mu$m towards the maximum usable range which is typically about 5 mm.

The amount of feedback via the second control loop can be adjusted by the microprocessor 12 by adjusting the level of gain provided by the digitally controlled gain block 9. By doing so the balance between range and resolution at short distances can be altered.

Figure 3:
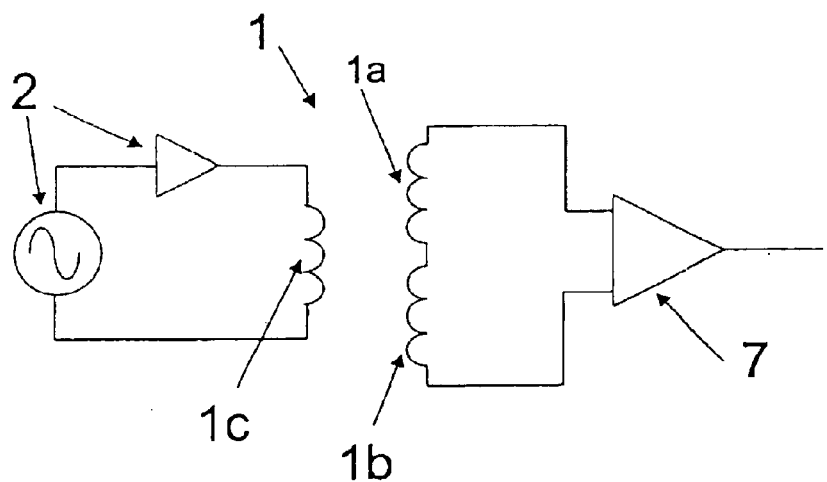
FIG. 3 shows a block circuit diagram of the probe of FIGS. 1 and 2 along with some components of the circuit of FIG. 1.
Figure 4:
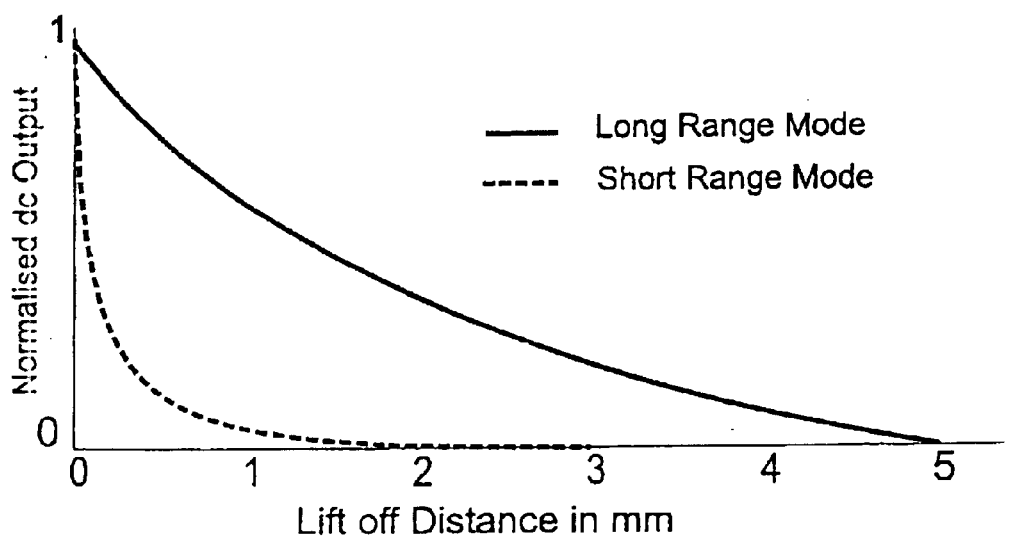
FIG. 4 shows a graph of the instrument's response in long and short range modes.

Normalized d.c. output of the digitally controlled gain block for both modes of operation of the instrument is shown in FIG. 3, plotted against the distance 21 of the probe tip 1d from a substrate 22. The short range mode is its normal mode of operation and achieves good lift-off sensitivity when the front pickup coil 1b is close to a ferromagnetic substrate material. The range of the probe 1 in this mode is limited and its lift-off sensitivity decreases significantly with increasing values of lift-off distance. The long range mode, however, has a reduced level of lift-off sensitivity near to a ferromagnetic substrate compared to the short range mode. In this long range mode, when the lift-off distance increases, the lift-off sensitivity does not significantly change. This results in better sensitivity (or resolution) in measuring thickness values above approximately 1 mm.

The instrument may be arranged to select the appropriate mode automatically, by starting in the long range mode and automatically selecting short range mode if the measured thickness value falls within the range of the short range mode.

The instrument confers numerous advantages over known instruments. Provision of a secondary control loop for the drive coil of the probe extends the measuring range of a given probe with little loss of performance above the normal range of the probe. Being able to vary the probe drive coil current using a digitally controlled potentiometer allows a wide range of different probe types to be used on a given instrument. The use of a synchronous detector controlled by an appropriately phase shifted signal provided by the drive coil oscillator, and a low pass filter, reduces the potential for interference from external signals which are asynchronous to that of the drive coil oscillator.

The above embodiment is described by way of example only, and many variations are possible without departing from the disclosure.

What is claimed is:

1. A coating thickness measuring instrument having a first mode of operation in which the instrument is operative to make measurements with a first resolution and a second mode of operation in which the instrument is operative to make measurements with a second resolution, the first resolution being greater than the second resolution, the instrument comprising:
    an inductive probe comprising a drive coil and a pick-up coil;
    a means for driving an alternating current in the drive coil;
    a means for detecting the output of the pick-up coil;
    a means for modifying the amplitude of the current in the drive coil in dependence upon the output of the pick-up coil; and
    a switch to enable the means for modifying the amplitude of the current in the drive coil to be switched in and out of operation, in order to switch the instrument between the first and second modes.

2. The instrument of claim 1, wherein when the instrument is in the first mode, the instrument is operative to make measurements in a first range and when the instrument is in the second mode, the instrument is operative to make measurements in a second range.

3. The instrument of claim 1, wherein when the instrument is in the first mode, the instrument is operative to make measurements in a first range at a high resolution and when the instrument is in the second mode, the instrument is operative to make measurements in a second range at a lower resolution, the second range being longer than the first range.

4. The instrument of claim 1, wherein when the instrument is in the first mode, the instrument is operative to make measurements in a first range and when the instrument is in the second mode, the instrument is operative to make measurements in a second range, such that the first range and the second range overlap.

5. The instrument of claim 1, wherein the inductive probe comprises two pickup coils.

6. The instrument of claim 1, wherein the inductive probe comprises two pickup coils; and the means for driving an alternating current in the drive coil is arranged to drive an alternating current of substantially constant amplitude in the drive coil.

7. The instrument of claim 1,
wherein the means for driving an alternating current comprises an oscillator and associated control loop circuit arranged to control the oscillator in dependence upon current flowing in the drive coil.

8. The instrument of claim 1, further including:
a means for varying the amplitude of alternating current flowing in the drive coil; and
wherein the means to drive an alternating current comprises an oscillator and associated control loop circuit arranged to control the oscillator in dependence upon current flowing in the drive coil.

9. The instrument of claim 8, wherein the means for varying the amplitude comprises a digitally controlled potentiometer.

10. The instrument of claim 1, wherein the inductive probe comprises two pickup coils; and further including
a means for sensing variation in coupling between the drive and pickup coils and converting the variation in coupling to a thickness value.

11. The instrument of claim 1, wherein the inductive probe comprises two pickup coils; and further including
a means for sensing variation in coupling between the drive and pickup coils and converting this to a thickness value;
wherein said means for sensing comprises a differential amplifier, means for rectifying the output of the pickup coils and an analog to digital converter.

12. The instrument of claim 1, wherein the inductive probe comprises two pickup coils; and further including
a means for sensing variation in coupling between the drive and pickup coils and converting the variation in coupling to a thickness value, said means for sensing comprising a differential amplifier, means for rectifying the output of the pickup coils and an analog to digital converter;
wherein the means for rectifying comprises a synchronous detector controlled by a synchronizing signal derived from the means to drive an alternating current in the drive coil.

13. The instrument of claim 1, wherein the inductive probe comprises two pickup coils; and
the means to modify the amplitude comprises a control loop arranged to reduce the amplitude of current supplied to the drive coil as differential output of the pickup coils increases.

14. The instrument of claim 1, comprising:
a microprocessor; and
a memory, the memory being operative to store look-up tables for both long and short range modes of operation and the microprocessor being operative to generate a coating thickness value using one of the look-up tables.

15. A coating thickness measuring instrument, comprising:
an inductive probe having a drive coil and a pickup coil;
a means for driving an alternating current in the drive coil;
a means for detecting the output of the pickup coil; and
a means for modifying the amplitude of the current in the drive coil in dependence upon the output of the pickup coil, said modifying means comprising a control loop which is switchable in and out of operation to provide two modes of operation for the instrument.

16. The instrument of claim 15, where in the means for modifying the amplitude of the current in the drive coil comprises a first control loop which is switchable in and out of operation to provide two modes of operation for the instrument and wherein the means for driving a current in the drive coil comprises a second control loop arranged to maintain the amplitude of current in the drive coil at a substantially constant level.

17. The instrument of claim 15, wherein the means for detecting the output of the pickup coil comprises a synchronous detector.

18. A coating thickness measuring instrument, comprising:
an inductive probe having a drive coil and a pickup coil;
a means for driving an alternating current in the drive coil;
a means for detecting the output of the pickup coil; and
a means for modifying the amplitude of the current in the drive coil in dependence upon the output of the pickup coil, said modifying means comprising a first control loop which is switchable in and out of operation to provide two modes of operation for the instrument, and wherein the means for driving comprises an amplitude controlled oscillator, and the first control loop is implemented by a current to voltage rectifier, a low pass filter and an error amplifier.

19. The instrument of claim 18, wherein the means for modifying is arranged to modify the input to the error amplifier and the amplitude of the current in the drive coil.

* * * * *